US009196238B2

(12) United States Patent
Inha et al.

(10) Patent No.: US 9,196,238 B2
(45) Date of Patent: Nov. 24, 2015

(54) AUDIO PROCESSING BASED ON CHANGED POSITION OR ORIENTATION OF A PORTABLE MOBILE ELECTRONIC APPARATUS

(75) Inventors: Kai Inha, Jarvenpaa (FI); Peter Sladen, Winchester (GB)

(73) Assignee: Nokia Technologies Oy, Espoo (FI)

( * ) Notice: Subject to any disclaimer, the term of this patent is extended or adjusted under 35 U.S.C. 154(b) by 654 days.

(21) Appl. No.: 13/518,871

(22) PCT Filed: Dec. 24, 2009

(86) PCT No.: PCT/EP2009/067930
§ 371 (c)(1), (2), (4) Date: Oct. 25, 2012

(87) PCT Pub. No.: WO2011/076290
PCT Pub. Date: Jun. 30, 2011

(65) Prior Publication Data

US 2013/0177168 A1 Jul. 11, 2013

(51) Int. Cl.
*H04R 5/02* (2006.01)
*G10K 11/16* (2006.01)
*H04N 5/60* (2006.01)
*H04S 3/00* (2006.01)
*H04S 7/00* (2006.01)
*H04N 21/414* (2011.01)
(Continued)

(52) U.S. Cl.
CPC ................ *G10K 11/16* (2013.01); *H04N 5/602* (2013.01); *H04N 21/41407* (2013.01); *H04N 21/4223* (2013.01); *H04N 21/42202* (2013.01); *H04N 21/42203* (2013.01); *H04N 21/439* (2013.01); *H04N 21/4334* (2013.01); *H04S 3/00* (2013.01); *H04S 7/303* (2013.01); *H04R 3/005* (2013.01); *H04S 3/002* (2013.01); *H04S 2420/11* (2013.01)

(58) Field of Classification Search
CPC combination set(s) only.
See application file for complete search history.

(56) References Cited

U.S. PATENT DOCUMENTS 4,653,102 A 3/1987 Hansen
5,526,429 A * 6/1996 Inanaga et al. .................. 385/25
(Continued)

FOREIGN PATENT DOCUMENTS

CN 101132839 2/2008
CN 101185368 A 5/2008
(Continued)

OTHER PUBLICATIONS

PCT Application No. PCT/US2008/013212 , "Electronic Device Directional Audio-Video Capture", filed on Nov. 26, 2008, 52 pages.
(Continued)

*Primary Examiner* — Duc Nguyen
*Assistant Examiner* — Assad Mohammed
(74) *Attorney, Agent, or Firm* — Harrington & Smith

(57) ABSTRACT

An apparatus comprising at least one processor and at least one memory including computer program code the at least one memory and the computer program code configured to, with the at least one processor, cause the apparatus at least to perform determining a change in position and/or orientation of an apparatus, and processing at least two audio signals dependent on the change in position and/or orientation to generate at least one output signal wherein the processing of the two audio signals dependent on the change in position and/or orientation produces the output signal comprising a representation of acoustic energy from a first direction.

18 Claims, 4 Drawing Sheets

(51) Int. Cl.

| | |
|---|---|
| ***H04N 21/422*** | (2011.01) |
| ***H04N 21/4223*** | (2011.01) |
| ***H04N 21/433*** | (2011.01) |
| ***H04N 21/439*** | (2011.01) |
| *H04R 3/00* | (2006.01) |

(56) References Cited

U.S. PATENT DOCUMENTS

| | | | | |
|---|---|---|---|---|
| 5,844,816 | A | 12/1998 | Inanaga et al. | |
| 6,021,206 | A * | 2/2000 | McGrath | 381/310 |
| 6,707,910 | B1 | 3/2004 | Valve et al. | |
| 6,781,619 | B1 * | 8/2004 | Shirakura et al. | 348/46 |
| 6,836,243 | B2 | 12/2004 | Kajala et al. | |
| 2002/0151996 | A1 * | 10/2002 | Wilcock et al. | 700/94 |
| 2003/0228023 | A1 | 12/2003 | Burnett et al. | |
| 2009/0116652 | A1 | 5/2009 | Kirkeby et al. | |
| 2009/0285404 | A1 | 11/2009 | Hsu et al. | |
| 2010/0128892 | A1 * | 5/2010 | Chen et al. | 381/92 |
| 2013/0083944 | A1 | 4/2013 | Kvist et al. | |

FOREIGN PATENT DOCUMENTS

| | | | |
|---|---|---|---|
| CN | 101278596 | A | 10/2008 |
| CN | 101479782 | A | 7/2009 |
| WO | 2006/125869 | A1 | 11/2006 |
| WO | WO 2006125869 | A1 * | 11/2006 |
| WO | 2009/070699 | A1 | 6/2009 |
| WO | WO 2011063857 | A1 * | 6/2011 |

OTHER PUBLICATIONS

International Search Report and Written Opinion received for corresponding International Patent Application No. PCT/EP2009/067930, dated May 20, 2010, 16 pages.

Office action received for corresponding European Patent Application No. 09812423.3, dated Nov. 26, 2013, 5 pages.

Office action received for corresponding European Patent Application No. 09812423.3, dated Nov. 6, 2014, 2 pages.

Office Action received for corresponding Canadian Application No. 2785080, dated May 15, 2014, 2 pages.

Office Action received for corresponding Chinese Application No. 200980163471.1, dated Jun. 4, 2014, 9 pages.

Office action received for corresponding Chinese Patent Application No. 200980163471.1, dated Dec. 18, 2014, 6 pages of Office Action and No English Language Translation available.

* cited by examiner 11
16
15
Microphone Array
Sensor Bank (Camera / Digital Compass / Accelerometers)
UI
14
ADC
21
Audio Processor Sensor Data
305
UI Initialize Signal
Target Selector / Tracker
301
Captured Digital Microphone Array Data
Ambisound A Format ⟶ B Format Converter
303
Channel Extractor / Beamformer
L, R, SL, SR, SL′, SR′

401
Select Target / Initialize Capture
403
Audio Process Microphone Array Dependent on First Orientation
405
Has Apparatus Moved ?
No
Yes
407
Audio Process Microphone Array Dependent on New Orientation

AUDIO PROCESSING BASED ON CHANGED POSITION OR ORIENTATION OF A PORTABLE MOBILE ELECTRONIC APPARATUS

RELATED APPLICATION

This application was originally filed as PCT Application No. PCT/EP2009/067930 filed Dec. 24, 2009.

The present invention relates to apparatus for processing of audio signals. The invention further relates to, but is not limited to, apparatus for processing audio and speech signals in audio devices.

In portable electronic apparatus, video and audio capture applications where the user can record social events are popular. In such environments, background sound sources or noise can easily interfere with the target sound source. For example at a party or live concert, there may be a significant amount of background noise which the user of the apparatus does not wish to capture or at least suppress in order to "focus" the audio capture on the target sound source.

Such apparatus may use a directional microphone or microphone array to capture the acoustic waves from a set direction or with a defined profile and output them as electronic signals representing the audio signals which then may be processed and transmitted to other devices or stored for later playback.

For example apparatus with two or more microphones may be used with adaptive filtering (in the form of variable gain and delay factors applied to the audio signals) from each of the microphones in an attempt to beamform the microphone array reception pattern to focus on the activity directly in front of the apparatus and thus avoid capturing noise or unwanted audio sources peripheral to the device.

Similarly as well as background noise suppression/target source enhancement the user of the apparatus may wish to produce a desired stable mix of audio channels from the captured audio signals based on the original direction of the apparatus relative to the target audio source.

However, there may be circumstances where the user is not able to maintain the apparatus direction. For example the user of the apparatus may wish to video the surroundings whilst maintaining capturing the sound source. For example during a wedding the user may wish to capture the vows spoken by the couple at the wedding and avoid capturing the congregation audio sources, and keeping the couple central in the audio stage, but at the same time move the camera focus to capture video of the interior of the church. Typically as the user moves the apparatus and the camera the microphone array is also moved and the audio capture focus and the audio mix balance on the couple is lost.

Furthermore there may be situations where the user is not physically able to maintain supporting the apparatus in the direction originally pointed, for example to avoid a potentially dangerous situation or where the user is physically tired from holding the apparatus at a fixed position. Typically in such circumstances the focus and the audio mix balance moves with the direction of the apparatus and would remix the captured audio signal wherever the device is pointed, even if this new direction is not the target sound source.

This invention proceeds from the consideration that the use of further information, for example sensor information, may assist the apparatus in the control of audio capture and thus, for example, assist in the reduction of noise of the captured audio signals or correct audio mixing.

Embodiments of the present invention aim to address the above problem.

There is provided according to a first aspect of the invention a method comprising: determining a change in position and/or orientation of an apparatus; and processing at least two audio signals dependent on the change in position and/or orientation to generate at least one output signal wherein the processing of the two audio signals dependent on the change in position and/or orientation produces the output signal comprising a representation of acoustic energy from a first direction.

The change in position and/or orientation is preferably at least one of: a relative change in position and/or orientation with respect to a target audio source; and an absolute change in position and/or orientation.

The change in position and/or orientation may comprise a change in rotational position.

The method may further comprise: generating for each audio signal at least one signal processing parameter dependent on a first position of the apparatus; and processing the at least two audio signals to produce an initial output signal comprising a representation of acoustic energy from the first direction.

Determining the change in position and/or orientation of an apparatus preferably comprises: determining whether the change in position and/or orientation of an apparatus is greater than at least one predefined value; and generating at least one signal processing parameter dependent on the at least one predefined value.

The method may further comprise: converting at least four ambisonic type A-format signals into at least four ambisonic type B-format signals; and wherein processing at least two audio signals dependent on the change in position and/or orientation to generate at least one output signal may comprise applying a rotation vector to at least one ambisonic type B-format signal, and the rotation vector further comprises an offset component dependent on the change in position of the apparatus.

The at least one audio signal may comprise at least one of: at least four ambisonic type A-format signals; at least four ambisonic type B-format signals; and at least one audio signal captured from at least one microphone.

The first direction is preferably defined by an orientation and a gain profile.

Determining a change in position and/or orientation of the apparatus may comprise determining a change in position and/or orientation from a first time period to a second time period using at least one of: a digital compass; an accelerometer; a gyroscope; a camera; and an acoustic characteristic determiner.

Determining a change in position and/or orientation of the apparatus using the camera may comprise: detecting an object of interest in a first image in the first time period; and detecting a displacement of the object of interest in a later image in the second time period.

According to a second aspect of the invention there is provided an apparatus comprising at least one processor and at least one memory including computer program code the at least one memory and the computer program code configured to, with the at least one processor, cause the apparatus at least to perform: determining a change in position and/or orientation of an apparatus; and processing at least two audio signals dependent on the change in position and/or orientation to generate at least one output signal wherein the processing of the two audio signals dependent on the change in position and/or orientation produces the output signal comprising a representation of acoustic energy from a first direction.

The change in position and/or orientation is preferably at least one of: a relative change in position and/or orientation with respect to a target audio source; and an absolute change in position and/or orientation.

The change in position and/or orientation preferably comprises a change in rotational position.

The at least one memory and the computer program code is configured to, with the at least one processor, cause the apparatus to preferably further perform: generating for each audio signal at least one signal processing parameter dependent on a first position and/or orientation of the apparatus; processing the at least two audio signals to produce an initial output signal comprising a representation of acoustic energy from the first direction.

Determining the change in position and/or orientation of an apparatus may cause the apparatus at least to perform: determining whether the change in position and/or orientation of the apparatus is greater than at least one predefined value; and generating at least one signal processing parameter dependent on the at least one predefined value.

The at least one memory and the computer program code is configured to, with the at least one processor, cause the apparatus to preferably further perform: converting at least four ambisonic type A-format signals into at least four ambisonic type B-format signals; and wherein processing at least two audio signals dependent on the change in position and/or orientation to generate at least one output signal may cause the apparatus at least to perform applying a rotation vector to at least one ambisonic type B-format signal, and the rotation vector further comprises an offset component dependent on the change in position and/or orientation of the apparatus.

The at least one audio signal may comprise at least one of: at least four ambisonic type A-format signals; at least four ambisonic type B-format signals; and at least one audio signal captured from at least one microphone.

The first direction is preferably defined by an orientation and a gain profile.

Determining a change in position and/or orientation of the apparatus may cause the apparatus to further perform determining the change in position and/or orientations from a first time period to a second time period using at least one of: a digital compass; an accelerometer; a gyroscope; a camera; an acoustic tracker; and an acoustic characteristic determiner.

Determining the change in position and/or orientation of the apparatus using the camera may cause the apparatus to further perform: detecting an object of interest in a first image in the first time period; and detecting a displacement of the object of interest in a later image in the second time period.

According to a third aspect of the invention there is provided an apparatus comprising: a sensor configured to determine a change in position and/or orientation of the apparatus; and a processor configured to process at least two audio signals dependent on the change in position and/or orientation to generate at least one output signal wherein the processing of the two audio signals dependent on the change in position and/or orientation produces the output signal comprising a representation of acoustic energy from a first direction.

The sensor is preferably configured to determine a change in position and/or orientation as a change in rotational position of the apparatus.

The processor is preferably further configured to generate for each audio signal at least one signal processing parameter dependent on a first position and/or orientation of the apparatus; and process the at least two audio signals to produce an initial output signal comprising a representation of acoustic energy from the first direction.

The processor preferably comprises: an ambisonic converter configured to convert at least four ambisonic type A-format signals into at least four ambisonic type B-format signals; and a vector rotatator configured to process the at least two audio signals dependent on the change in position and/or orientation to apply a rotation vector to at least one ambisonic type B-format signal, and the rotation vector further comprises an offset component dependent on the change in position and/or orientation of the apparatus.

The apparatus may comprise a microphone array configured to capture the at least one audio signal as at least one of: at least four ambisonic type A-format signals; at least four ambisonic type B-format signals; and at least one audio signal captured from at least one microphone of the microphone array.

The first direction is preferably defined by an orientation and a gain profile.

The apparatus may further comprise at least one of: a digital compass; an accelerometer; a gyroscope; a camera; an acoustic tracker; and an acoustic characteristic determiner.

The camera may further determine the change in position and/or orientation of the apparatus by being configured to: detect an object of interest in a first image in a first time period; and detect a displacement of the object of interest in a later image in a second time period.

The acoustic characteristic determiner may further determine the change in position and/or orientation of the apparatus by being configured to: detect an acoustic characteristic for an object of interest in a first time period; and detect a displacement of the acoustic characteristic for the object of interest in a later image in a second time period.

According to a fourth aspect of the invention there is provided an apparatus comprising: sensing means for determining a change in position and/or orientation of the apparatus; and processing means for processing at least two audio signals dependent on the change in position and/or orientation to generate at least one output signal wherein the processing of the two audio signals dependent on the change in position and/or orientation produces the output signal comprising a representation of acoustic energy from a first direction.

According to a fifth aspect of the invention there is provided a computer-readable medium encoded with instructions that, when executed by a computer perform: determining a change in position and/or orientation of an apparatus; and processing at least two audio signals dependent on the change in position and/or orientation to generate at least one output signal wherein the processing of the two audio signals dependent on the change in position and/or orientation produces the output signal comprising a representation of acoustic energy from a first direction.

An electronic device may comprise apparatus as described above.

A chipset may comprise apparatus as described above.

BRIEF DESCRIPTION OF DRAWINGS

For better understanding of the present invention, reference will now be made by way of example to the accompanying drawings in which.

Figure 1:
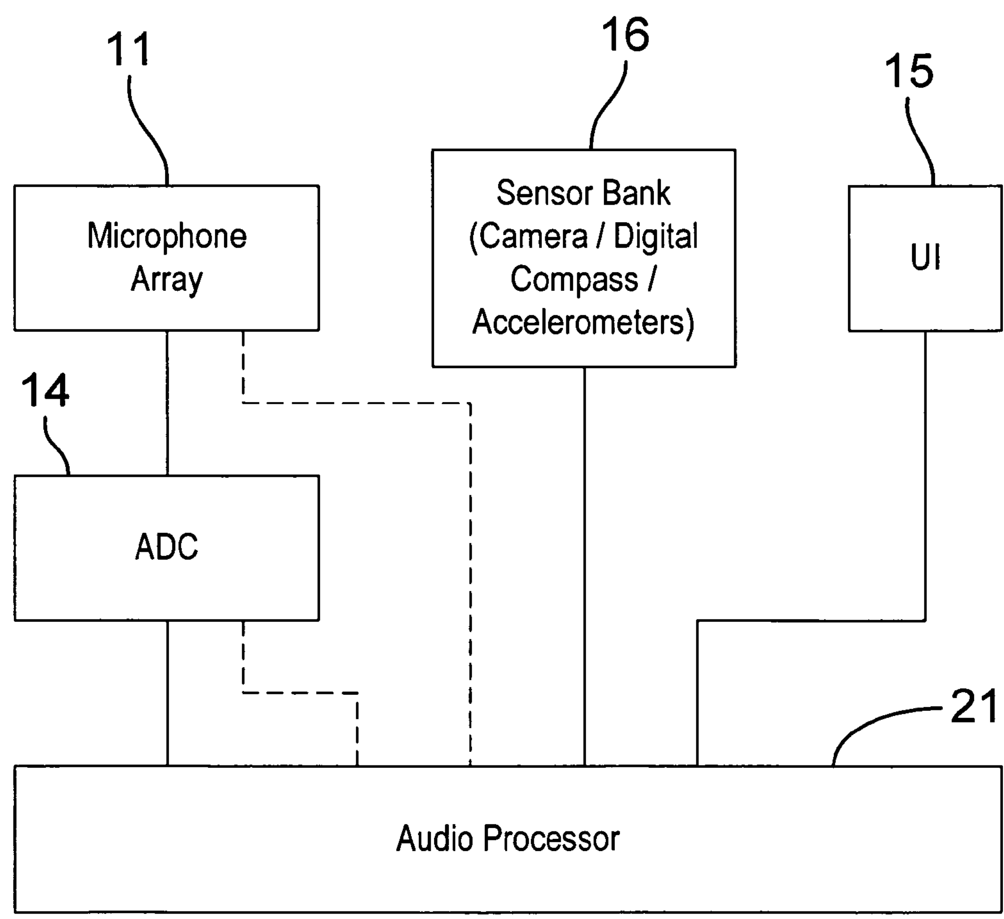
FIG. 1 shows schematically an apparatus employing embodiments of the application.

The following describes apparatus and methods for the provision of enhancing audio capture and recording flexibility apparatus with a microphone array. In this regard reference is first made to FIG. 1 which shows a schematic block diagram of an exemplary electronic device 10 or apparatus, which may incorporate enhanced audio signal capture performance components and methods. Although the following examples have been described with respect to audio capture apparatus it would be appreciated that the embodiments described may be used as part of an audio/video capture apparatus audio sub-system. The embodiments of the application attempt to use sensor information to enhance the audio signal capture of apparatus by being able to control a channel selection or beamforming operation in order to maintain a 'focus' or targeted audio direction independent of the apparatus actual orientation or angle. In other words in such embodiments as described below it is possible to maintain a audio targeted direction or beamforming or even channel extraction relative to an absolute direction and independent of the apparatus. In some embodiments this absolute direction may change if the target sound source moves.

The apparatus 10 may for example be a mobile terminal or user equipment for a wireless communication system. In other embodiments the apparatus may be any audio recorder/player, for example a mp3 player, media player, digital or audio recorder, digital video recorder equipped with suitable microphone array and sensors as described below.

The apparatus 10 in some embodiments comprises an audio processor 21. The audio processor 21 may be configured to execute various program codes. The implemented program codes may comprise an audio capture enhancement code.

The implemented program codes may be stored for example in a memory for retrieval by the audio processor whenever needed. The memory could further provide a section for storing data, for example data that has been processed in accordance with the embodiments.

The audio capture enhancement code may in embodiments be implemented at least partially in hardware or firmware.

The audio processor 21 may be linked to a user interface (UI).

The user interface 15 may enable a user to input commands to the electronic device 10, for example via a keypad, buttons or switches and/or to obtain information from the apparatus 10, for example via a display (not shown). It would be understood that the user interface 15 may furthermore in some embodiments be any suitable combination of input and display technology, for example a touch screen display suitable for both receiving inputs from the user and displaying information to the user.

The apparatus 10 may in some embodiments further comprise at least two microphones in a microphone array 11 for inputting or capturing acoustic waves and outputting audio or speech signals to be processed according to embodiments of the application. The audio or speech signals may, according to some embodiments, be stored in a data section of the memory for later processing.

A corresponding program code or hardware to control the capture of audio signals using the at least two microphones may be activated to this end by the user via the user interface 15.

The apparatus 10 in such embodiments may further comprise an analogue-to-digital converter (ADC) 14 configured to convert the input analogue audio signals from the microphone array 11 into digital audio signals and provide the digital audio signals to the processor 21. In some embodiments the microphone elements themselves comprise a suitable analogue-to-digital converter and thus output digital audio signals directly to the processor 21.

Figure 2A:
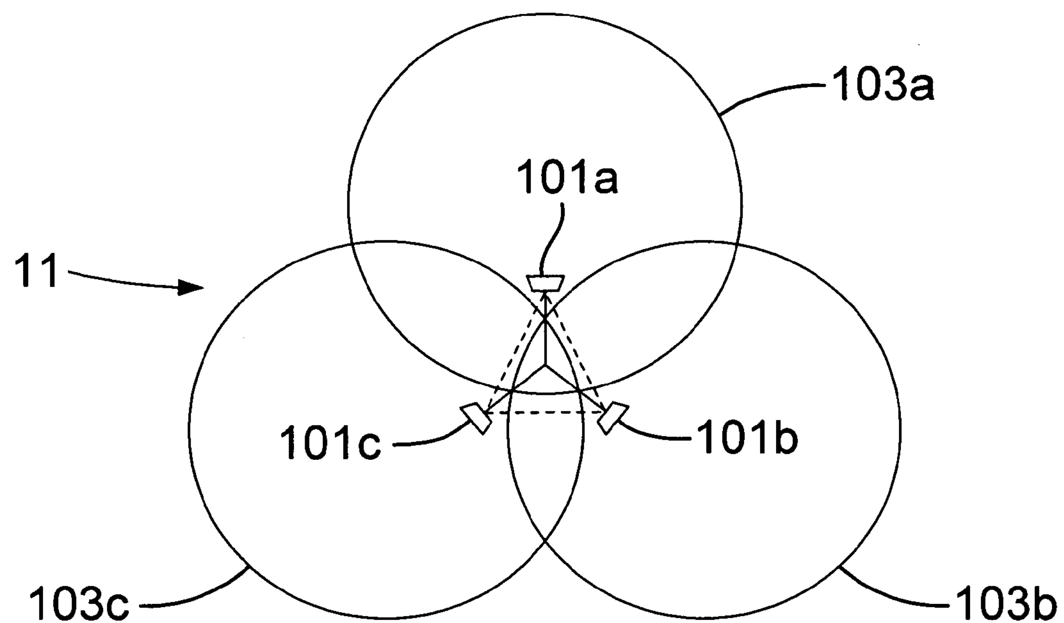
FIGS. 2*a* and 2*b* show schematically two microphone configuration arrangement suitable for use in apparatus such as shown in FIG. 1 implementing some embodiments of the application.
Figure 2B:
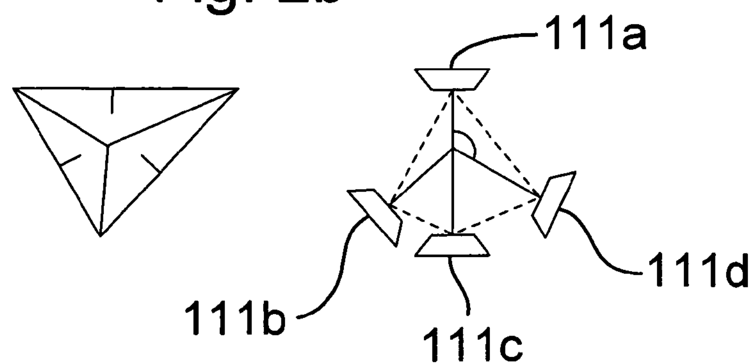

With respect to FIGS. 2*a* and 2*b*, two example microphone array configurations are shown in further detail. With respect to FIG. 2*a*, a two dimensional omniorientation microphone array configuration is shown. The microphone configuration is such that each microphone is directed with a primary axis 120° away from the other two microphones primary axis. In this configuration, only three microphones are required to cover a complete 360° two dimensional plane and provide a possible omniorientational coverage from non-omnidirectional profile microphones. Thus a first microphone 101*a* has a coverage or profile given by the gain profile 103*a* which is directed along a primary axis 120° from the second microphone 101*b* gain profile 103*b* primary axis and also 120° from the third microphone 101*c* gain profile 103*c* primary axis. Similarly the second microphone 101*b* gain profile 103*b* primary axis is also 120° from the third microphone 101*c* gain profile 103*a* primary axis. In such microphone configuration an omniorientation microphone (a 2-D omnidirectional microphone) may be simulated by adding together all three microphone outputs and directional X-axis and Y-axis microphones by weighted combining of the three microphone outputs.

With respect to FIG. 2*b*, a three dimensional "omnidirectional" microphone array configuration is shown where each microphone is considered to be directed perpendicular to a face of a tetrahedron. Thus with only four microphones, a full 360° solid angle coverage or profile is provided. In other words the four microphones may be combined to produce a synthesised omnidirectional audio signal even if they are do not have an omnidirectional audio signal capture profile themselves. In the following examples, a four microphone array configuration as described may be used to enhance audio recording, however it would be appreciated that any suitable microphone configuration may be used with similar effect.

The audio output of the microphones may be considered to be the equivalent to an ambisonic A-format encoding. In this encoding format the first microphone 111*a* may be the left, front, up (LFU) microphone, the second microphone 111*b* may be the left, back, down (LBD) microphone, the third microphone 111*c* may be the right, front, down (RFD) microphone and the fourth microphone 111*d* may be the right, back, up (RBU) microphone according to the convention of labelling used in ambisonic A-format encoding.

The apparatus 10 may in some embodiments receive the audio signals from a microphone array 11 not implemented physically on the electronic device. For example the microphone array may be implemented of a separate device, such as a microphone boom. The microphone boom may then transmit the audio signals to the apparatus 10 via transceiver.

The received audio data may in some embodiments be stored, instead of being processed immediately, in the data section of the memory, for instance for later processing and presentation or forwarding to another electronic device. In such embodiments the apparatus may store sensor information associated with the audio data and be processed according in an offline mode.

Furthermore the apparatus 10 may comprise sensors or a sensor bank 16. The sensor bank 16 receives information about the environment in which the apparatus 10 is operating and passes this information to the processor 21 in order to affect the processing of the audio signal and in particular to affect the processor 21 in audio capture/recording applications. The sensor bank 16 may comprise at least one of the following set of sensors.

The sensor bank 16 may in some embodiments comprise a camera module. The camera module may in some embodiments comprise at least one camera having a lens for focusing an image on to a digital image capture means such as a charged coupled device (CCD). In other embodiments the digital image capture means may be any suitable image capturing device such as complementary metal oxide semiconductor (CMOS) image sensor. The camera module further comprises in some embodiments a lamp or light source for illuminating an object before capturing an image of the object. In other embodiments the camera may be configured to perform infra-red and near infra-red sensing for low ambient light sensing. In some embodiments the sensor bank 16 comprises a position/orientation sensor. The position/orientation sensor in some embodiments may be implemented by a 3-D digital compass or solid state compass configured to determine the apparatus orientation with respect to the horizontal axis and azimuth with respect to the vertical axis. In some embodiments the position/orientation sensor may be a 2-D compass configured to determine the apparatus orientation with respect to the horizontal axis only.

In some other embodiments the position/orientation sensor may be at least one accelerometer or gyroscope configured to determine a change in acceleration in at least one axis.

It is to be understood again that the structure of the apparatus 10 could be supplemented and varied in many ways.

Figure 3:
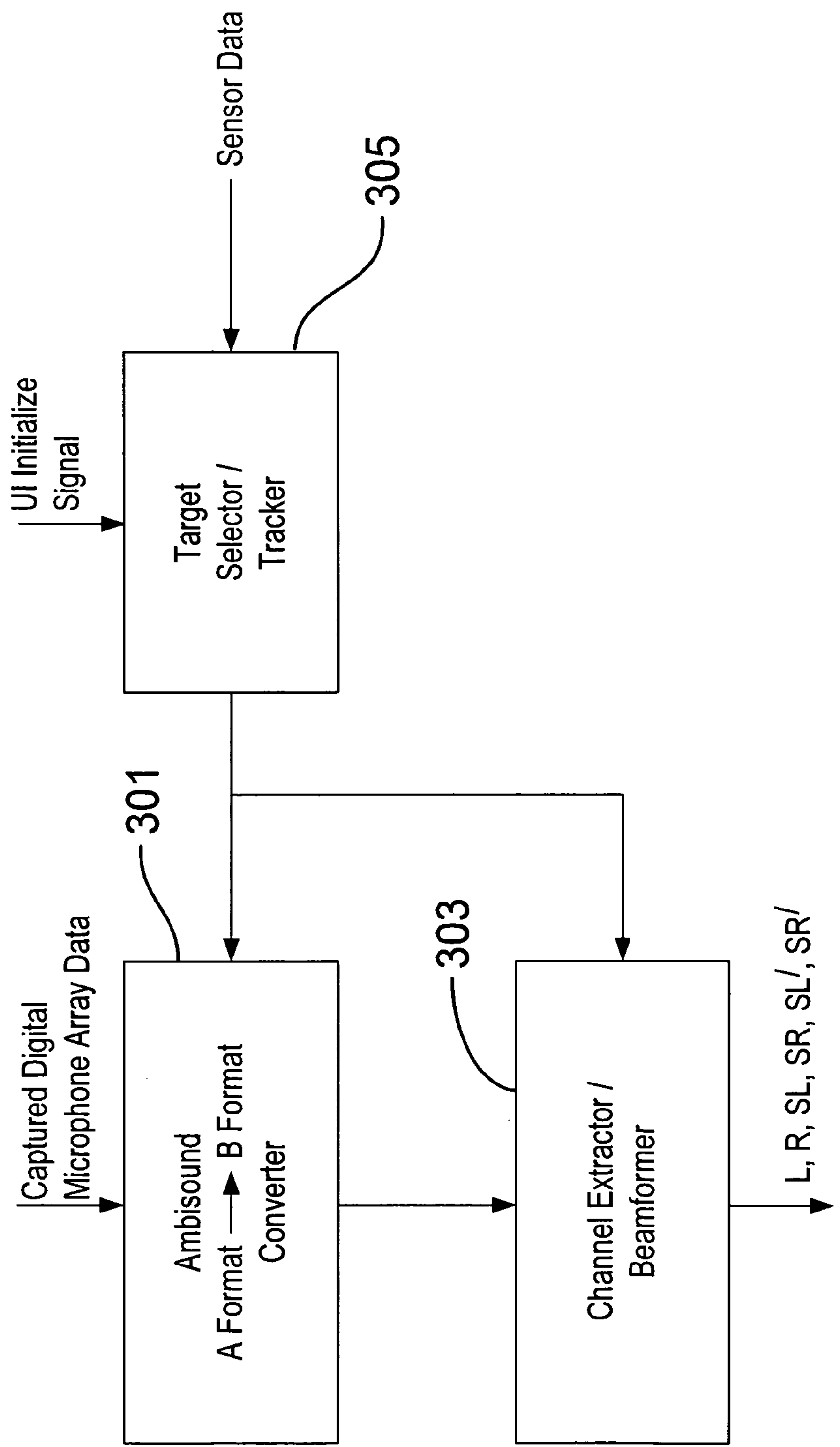
FIG. 3 shows schematically the apparatus shown in FIG. 1 in further detail according to some embodiments.
Figure 4:
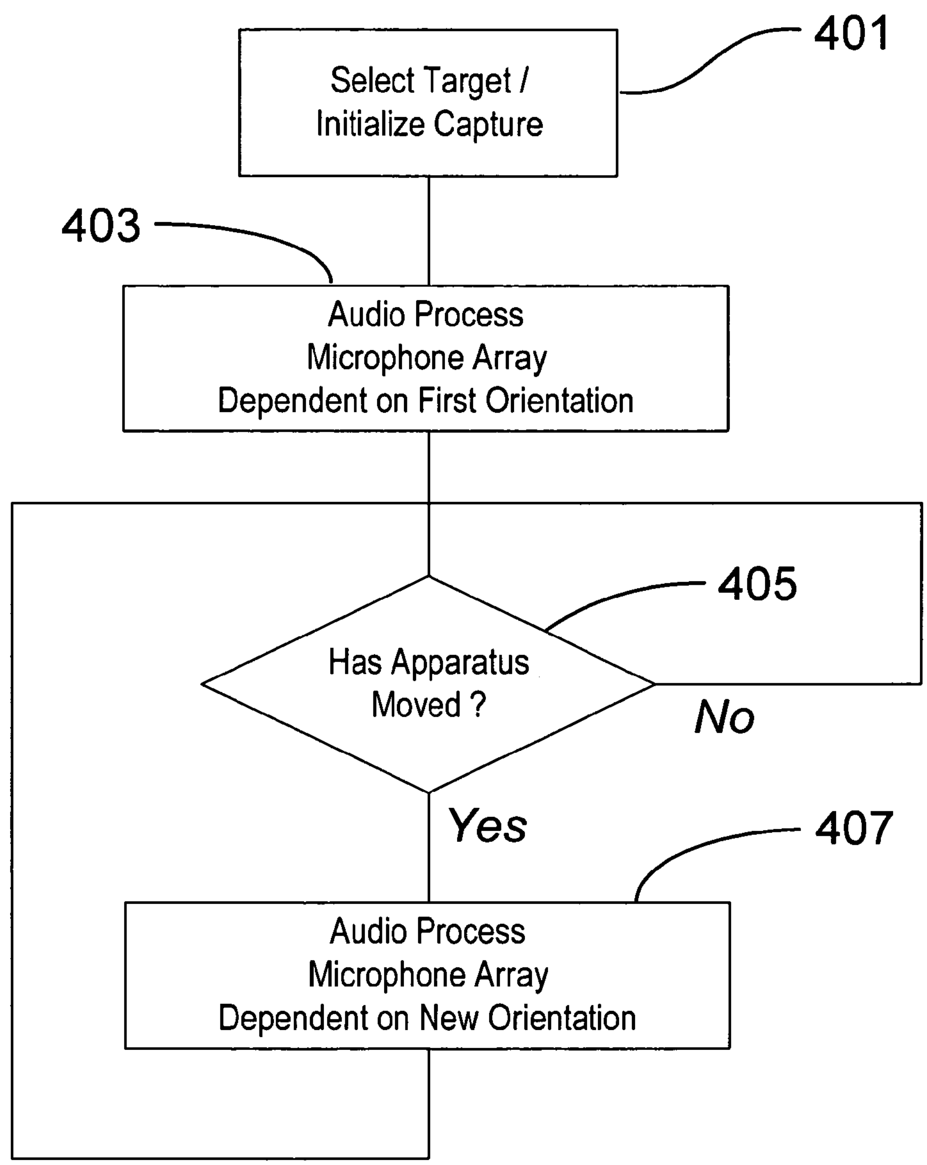
FIG. 4 shows a flow diagram illustrating the operation of the apparatus according to some embodiments of the application.

It would be appreciated that the schematic structures described in FIG. 3 and the method steps in FIG. 4 represent only a part of the operation of a complete audio capture/recording chain comprising some embodiments as exemplary shown implemented in the apparatus shown in FIG. 1. With respect to FIG. 3, a schematic view of the processor is shown in further detail with respect to some embodiments of the application.

With respect to FIG. 4, the operations of the apparatus shown in FIG. 3 are described in further detail.

The processor may in some embodiments comprise a target selector/tracker 305. The target selector/tracker 305 is configured to initialize the audio capture process dependent on the sensor input. In some embodiments the target selector/tracker 305 receives an input from the user interface to start the capture process or in other embodiments selecting an object to which the apparatus may produce a 'sound lock' to. In some embodiments the input from the user interface may be a 'rec' or record function which starts the recording of both the audio and the video data by the apparatus.

On detecting a valid capture initialization input the target selector/tracker 305 may transmit a signal to initialize the ambisonic converter 301 and also the channel extractor/beamformer 303. In some embodiments the target selector/tracker 305 may transmit a signal to the channel extractor containing information or data about the apparatus' initial orientation.

As described previously the microphone array in some embodiments is configured to capture audio signals from each of the microphones in the array. For the examples described hereafter the 3D microphone array shown in FIG. 2*b* supplies the captured audio signals. However it would be appreciated that fewer or more microphones and configurations other than the 3D tetrahedral structure shown in FIG. 2*b* may be employed.

The microphone audio signals in some embodiments are passed to an analogue-to-digital converter 14 which are converted into a digital format also known as a raw microphone datA-format or an ambisonic A-format signal.

The audio processor 21 is configured to receive the digital audio at an Ambisonic A-format (or raw microphone format) to B-Format converter.

The Ambisonic A-format to B-format converter 301 is configured to receive the digital microphone array data from each of the microphones within the microphone array such as those shown configured in FIG. 2*b* and generate, dependent on the initialization signal from the target selector/tracker 305, a synthesised audio signal set which represents an overall sound pressure level, the W digital signal, and a series of orthogonal projected sound pressure levels, the X, Y and Z digital signals.

In the B-format encoding, also known as first-order Ambisonics, sound information is encoded into four channels: W, X, Y and Z. The W channel is the non-directional mono component of the signal, corresponding to the output of an omnidirectional microphone. The X, Y and Z channels are the directional components in three dimensions. They, correspond to the outputs of three figure-of-eight microphones, facing forward, to the left, and upward respectively.

The B-format signals are thus based on a spherical harmonic decomposition of the sound field and correspond to the sound pressure (W), and the three components of the pressure gradient (X, Y, and Z) at a point in space. Together, these approximate the sound field on a sphere around the microphone; formally the first-order truncation of the multipole expansion. This is called "first-order" because W (the mono signal) is the zero-order information, corresponding to a sphere (constant function on the sphere), while X, Y, and Z are the first-order terms (the dipoles), corresponding to the response of figure-of-eight microphones—as functions, to particular functions that are positive on half the sphere, and negative of the other half. This first-order truncation is an approximation of the overall sound field.

Any playback of B-format ambisound signals may be derived by using a linear combination of these four channels, where each signal is dependent on the actual position of the speaker in relation to the center of an imaginary sphere the surface of which passes through all available speakers. In more advanced decoding schemes, spatial equalization is in some embodiments applied to the signals to account for the differences in the high- and low-frequency sound localization mechanisms in human hearing. A further refinement may account for the distance of the listener from the loudspeakers.

The A-format to B-format converter 301 may therefore in some embodiments generate a W, X, Y and Z format digital audio signal from the microphone captured LFU, FBD, RBU and RFD digital audio signals using the following equations:

$$W=-(\mathrm{LFU}+\mathrm{LBD}+\mathrm{RBU}+\mathrm{RFD})$$

$$X=2.83(-\mathrm{LFU}+\mathrm{LBD}+\mathrm{RBU}-\mathrm{RFD})$$

$$Y=2.83(-\mathrm{LFU}-\mathrm{LBD}+\mathrm{RBU}+\mathrm{RFD})$$

$$Z=2.83(-\mathrm{LFU}+\mathrm{LBD}-\mathrm{RBU}+\mathrm{RFD})$$

The converted B-format digital audio signals may then be passed to the channel extractor 303.

The channel extractor/beamformer 303, having received the ambisonic B-format audio signals, and the initialization signal from the target selector/tracker then performs a beamforming or channel extraction to produce the required number of audio output channels.

The channel extractor 303 in some embodiments determines the position of each of the required number of audio channels from a predetermined list of speaker orientations which contain data on where the required audio output channels are with respect to the apparatus.

The channel extractor 303 may then output audio signals reflecting the required orientation using the following equation (assuming that there is no Z channel component as the speakers are in the X-Y plane).

$$Pn=W+X\cos(\theta n)+Y\sin(\theta n),$$

where θn is the direction/orientation of the speaker (or channel) relative to the original apparatus orientation.

In other words the channel extractor 303 generates each of the channels by calculating the angle between the front back (X axis or initial orientation of the apparatus) and the required channel orientation.

In some embodiments this may be calculated using a single calculation for each channel.

In such embodiments, fixed point processing should be sufficient to generate the channel audio signals and thus may be calculated quickly without need for floating point calculations. For example in some embodiments a look-up table may be used which would require only 720 bits in total to store the correct cosine and sine values for a orientation step size of 1 degree.

In some embodiments the channel extractor may furthermore have the cosine and sine values for predefined audio format configurations. For example the following table of values may be used in a six channel audio system:

| O/P | W | X | Y |
|---|---|---|---|
| L | 0.5018 | 0.6218 | 0.4406 |
| R | 0.5018 | 0.6218 | −0.4406 |
| SL | 0.8392 | −0.3692 | 0.5757 |
| SR | 0.8392 | −0.3692 | −0.5757 |
| SL' | 0.4465 | −0.1964 | 0.3063 |
| SR' | 0.4465 | −0.1964 | −0.3063 |

where L is left front channel, R is right front channel, SL is surround left (left rear) channel, SR is surround right (right rear), SL' is second surround left (left rear-mid) and SR' is second surround right (right rear-mid).

The initial processing of the audio signal is shown in FIG. 4 by step 403.

Furthermore the target selector/tracker 305 is configured to maintain a track on the target position/orientation by monitoring the output of the sensor bank 16. In some embodiments the target selector/tracker 305 determines from this information whether or not the apparatus has moved (in relation to the audio stage).

For example where the sensor bank 16 comprises a compass, for example a 3-D or 2-D compass, the target selector/tracker 305 may receive the sensor data as a digital representation of the X-Y plane orientation. Any difference in sensor input may be converted to a suitable angle format and used to determine whether the apparatus has moved.

Furthermore in some embodiments where the sensor bank 16 comprises an accelerometer or gyroscope, the output from the accelerometer or gyroscope may be monitored by the target selector/tracker 305. The target selector/tracker 305 may using relevant look up tables or processing detect any change in orientation or movement of the apparatus.

Further in some embodiments where the sensor bank 16 comprises a camera the output of the camera may be monitored by the target selector/tracker 305. In such embodiments a series of images captured at a first instance may be processed to determine any points of interest in the images which are located at a far distance and close to the original axis of the apparatus to the apparatus. For example the camera may determine a point of interest when video/audio recording an orchestra event such as a fixed light pattern from the stage or light reflections from a stable structure such as a pillar, door, or similar. The target selector/tracker 305 may then monitor further captured images to determine movement of the point of interest from image to image to determine an approximate angle of displacement of the audio capture or recording beam direction.

In some embodiments the selection of the target source may be associated with a specific acoustic characteristic. For example in some embodiments the target selector/tracker may perform an acoustic fingerprinting of the source. An acoustic fingerprinting may for example identify a specific relationship between a fundamental and harmonic frequencies of the target source. The target tracker/selector may then in some embodiments track the target source by monitoring any movement in the acoustic properties of the signals from the microphones.

Such an acoustic characteristic determiner may thus in some embodiments determine the change in position and/or orientation of the apparatus by being configured to: detect an acoustic characteristic for an object of interest in a first time period; and detect a displacement of the acoustic characteristic for the object of interest in a later image in a second time period. In other embodiments any suitable acoustic tracking operation or components may be employed to assist in the tracking of the object of interest.

In some embodiments the determination of movement is a threshold event. In other words only when a sufficiently large movement is detected then the target selector/tracker is triggered to output any further information to the channel extractor/beamformer 303. In some other embodiments the determination of movement is continuous and any change is detected and affects a change in the position/angle output passed to the channel extractor/beamformer 303.

The determination of movement is shown in FIG. 4 by step 405.

If no or insufficient movement is detected then the target tracker continues to monitor the sensors and the channel extractor/beamformer 303 continues to process the B-format audio signals using the same speaker orientations.

If no or insufficient movement is detected by the target selector/tracker 305 then the target selector/tracker 305 passes an orientation offset value or orientation absolute value to the channel extractor/beamformer 303. The channel extractor/beamformer may then process the B-format audio signals using the speaker orientations with the orientation offset value or new absolute speaker orientation value.

For example in such embodiments any detected change in angle of the apparatus δθ may then be passed to the channel extractor and the values of the channels recalculated using a new value of θ, $\theta_{new}=\theta+\delta\theta$.

Thus in such embodiments, the apparatus may produce an accurate and continuous representation of the sound stage even when the apparatus moves.

Thus in some embodiments an audio "image" stabilisation is achieved where the audio stage is stabilised independent of motion of the apparatus.

The audio processor 21 furthermore may output the audio channel data in some embodiments for further processing to process the audio signal according to any suitable audio processing algorithm to produce a more efficiently encoded data stream suitable for storage or transmission. For example in some embodiments the audio processor 21 may further process the Ambisonic format signal to convert it into a further format.

Although the above examples have been described with respect to 2D target selection and tracking It would be appreciated that a similar approach may be used for 3D target selection and tracking, for example the target tracker 503 outputs orientation angles θ representing the X-Y orientation, and ϕ representing the Z orientation. In other words the 2D or 3D compass or accelerometer may be used together or separately to produce compensation data for audio targeting compensation.

Furthermore although the above examples use the ambisonic audio format any suitable digital audio format may be used with a suitable beamforming processing. For example the beamforming/channel extraction operation may apply a finite impulse response (FIR) or infinite impulse response (IIR) digital filter to each microphone input signal.

The finite impulse digital filters may be pure gain (in other words with no memory) or gain and delay filtering of the digital microphone audio signals.

Although the above examples describe embodiments of the invention operating within an electronic device 10 or apparatus, it would be appreciated that the invention as described below may be implemented as part of any audio processor.

Thus, for example, embodiments of the invention may be implemented in an audio processor which may implement audio processing over fixed or wired communication paths.

Thus user equipment may comprise an audio processor such as those described in embodiments of the invention above.

It shall be appreciated that the term user equipment is intended to cover any suitable type of wireless user equipment, such as mobile telephones, portable data processing devices or portable web browsers.

In general, the various embodiments of the invention may be implemented in hardware or special purpose circuits, software, logic or any combination thereof.

For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Therefore in summary there is in at least one embodiment an apparatus comprising: a sensor configured to determine a change in position and/or orientation of the apparatus; and a processor configured to process at least two audio signals dependent on the change in position and/or orientation to generate at least one output signal wherein the processor may be configured to process the two audio signals dependent on the change in position and/or orientation to produce the output signal comprising a representation of acoustic energy from a first direction.

Or in some embodiments there may be an apparatus comprising at least one processor and at least one memory including computer program code the at least one memory and the computer program code configured to, with the at least one processor, cause the apparatus at least to perform: determining a change in position and/or orientation of an apparatus; and processing at least two audio signals dependent on the change in position and/or orientation to generate at least one output signal wherein the processing of the two audio signals dependent on the change in position and/or orientation produces the output signal comprising a representation of acoustic energy from a first direction.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

Thus at least one embodiment comprises a computer-readable medium encoded with instructions that, when executed by a computer perform: determining a change in position and/or orientation of the apparatus; and processing at least two audio signals dependent on the change in position and/or orientation to generate at least one output signal wherein the processing of the two audio signals dependent on the change in position and/or orientation produces the output signal comprising a representation of acoustic energy from a first direction.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term 'circuitry' refers to all of the following:

(a) hardware-only circuit implementations (such as implementations in only analog and/or digital circuitry) and (b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising;

receiving at least two audio signals based on acoustic energy captured from a target audio source by a portable electronic apparatus;

determining a change in one or more of position and orientation of the apparatus; and processing the at least two audio signals dependent on the change in one or more of position and orientation to generate at least two output signals comprising a representation of acoustic energy from the direction of the target audio source;

wherein determining change in one or more of position and orientation of the apparatus comprises determining the change in one or more of position and orientation from a first time period to a second time period using a camera;

wherein determining the change in one or more of position and orientation of the apparatus using the camera comprises:

detecting an object of interest in a first image in the first time period; and detecting a displacement of the object of interest in a later image in the second time period so as to track the object associated with the target audio source.

2. The method as claimed in claim 1, wherein the change in one or more of position and orientation is at least one of:

a relative change in one or more of position and orientation with respect to the target audio source; and an absolute change in one or more of position and orientation of the apparatus.

3. The method as claimed in claim 1, wherein the change in one or more of position and orientation comprises a change in rotational position of the apparatus.

4. The method as claimed in claim 1, further comprising:

generating for each audio signal at least one signal processing parameter dependent on a first position of the apparatus;

processing the at least two audio signals to produce an initial output signal comprising a representation of acoustic energy from the direction of the target audio source.

5. The method as claimed in claim 1, wherein determining the change in one or more of position and orientation of the apparatus comprises:

determining whether the change in one or more of position and orientation of the apparatus is greater than at least one predefined value; and generating at least one signal processing parameter dependent on the at least one predefined value.

6. The method as claimed in claim 1, further comprising:

converting a first format signal into a second format signal; and wherein processing at least two audio signals dependent on the change in one or more of position and orientation to generate at least one output signal comprises applying a rotation vector to the second format signal, and the rotation vector further comprises an offset component dependent on the change in position of the apparatus.

7. The method as claimed in claim 1, wherein at least one of the at least two audio signals comprises at least one of:

at least four ambisonic type A-format signals;

at least four ambisonic type B-format signals; and at least one audio signal captured from at least one microphone.

8. The method as claimed in claim 1, wherein the direction of the target audio source is defined by an orientation and a gain profile.

9. The method as claimed in claim 1, wherein determining the change in one or more of position and orientation of the apparatus comprises determining a change in one or more of position and orientation from the first time period to the second time period using at least one of:

a digital compass;

an accelerometer;

a gyroscope an acoustic tracker; and a camera.

10. An apparatus comprising at least one processor and at least one non-transitory computer readable medium containing computer program code that, when executed b the processor, causes the processor to cause the apparatus at least to:

receive at least two audio signals based on acoustic energy captured from a target audio source;

determine a change in one or more of position and orientation of the apparatus; and process at least two audio signals dependent on the change in one or more of position and orientation to generate at least two output signals comprising a representation of acoustic energy from the direction of the target audio source;

wherein determining the change in one or more of position and orientation of the apparatus comprises determining the change in one or more of position and orientation from a first time period to a second time period using a camera;

wherein determining the change in one or more of position and orientation of the apparatus using the camera comprises:

detecting an object of interest in a first image in the first time period; and detecting a displacement of the object of interest in a later image in the second time period so as to track the object associated with the target audio source.

11. The apparatus as claimed in claim 10, wherein the change in one or more of position and orientation is at least one of:

a relative change in one or more of position and orientation with respect to the target audio source; and an absolute change in one or more of position and orientation of the apparatus.

12. The apparatus as claimed in claim 10, wherein the change in one or more of position and orientation comprises a change in rotational position of the apparatus.

13. The apparatus as claimed in claim 10, wherein the at least one non-transitory computer readable medium containing the computer program code is configured to, with the at least one processor, causes the apparatus to:

generate for each audio signal at least one signal processing parameter dependent on one or more of a first position and orientation of the apparatus;

process the at least two audio signals to produce an initial output signal comprising a representation of acoustic energy from the direction of the target audio source.

14. The apparatus as claimed in claim 10, wherein causing the apparatus to determine the change in one or more of position and orientation causes the apparatus at least to:

determine whether the change in one or more of position and orientation of the apparatus is greater than at least one predefined value; and generate at least one signal processing parameter dependent on the at least one predefined value.

15. The apparatus as claimed in claim 10, wherein the at least one non-transitory computer readable medium containing the computer program code is configured to, with the at least one processor, causes the apparatus to:

convert a first format signal into a second format signal; and wherein causing the apparatus to process at least two audio signals dependent on the change in one or more of position and orientation to generate at least one output signal causes the apparatus at least to apply a rotation vector to the second format signal, and the rotation vector further comprises an offset component dependent on the change in one or more of position and orientation of the apparatus.

16. The apparatus as claimed in claim 10, wherein at least one of the at least two audio signals comprises at least one of:

at least four ambisonic type A-format signals;

at least four ambisonic type B-format signals; and at least one audio signal captured from at least one microphone.

17. The apparatus as claimed in claim 10, wherein the direction of the target audio source is defined by an orientation and a gain profile.

18. The apparatus as claimed in claim 10, wherein causing the apparatus to determine a change in one or more of position and orientation of the apparatus causes the apparatus to further determine the change in one or more of position and orientations from a first time period to a second time period using at least one of:

a digital compass;

an accelerometer;

a gyroscope an acoustic tracker; and a camera.

* * * * *